United States Patent
Yun et al.

(10) Patent No.: US 9,389,599 B2
(45) Date of Patent: Jul. 12, 2016

(54) SYSTEM AND METHOD FOR CONTROLLING AIR CONDITIONER

(71) Applicant: LG ELECTRONICS INC., Seoul (KR)

(72) Inventors: Sangwon Yun, Changwon-si (KR); Duckgu Jeon, Changwon-si (KR)

(73) Assignee: LG ELECTRONICS INC., Seoul (KR)

( * ) Notice: Subject to any disclaimer, the term of this patent is extended or adjusted under 35 U.S.C. 154(b) by 311 days.

(21) Appl. No.: 13/865,372

(22) Filed: Apr. 18, 2013

(65) Prior Publication Data
US 2013/0304267 A1 Nov. 14, 2013

(30) Foreign Application Priority Data
Apr. 19, 2012 (KR) .................. 10-2012-0041076

(51) Int. Cl.
*G05B 13/02* (2006.01)
*F24F 11/00* (2006.01)

(52) U.S. Cl.
CPC .............. *G05B 13/02* (2013.01); *F24F 11/006* (2013.01)

(58) Field of Classification Search
CPC ............................... G05B 13/02; F24F 11/006
See application file for complete search history.

(56) References Cited

U.S. PATENT DOCUMENTS

| | | | | |
|---|---|---|---|---|
| 7,039,532 B2* | 5/2006 | Hunter | | 702/61 |
| 7,774,245 B2* | 8/2010 | Voysey | | 705/34 |
| 8,200,370 B2* | 6/2012 | Paik | | 700/291 |
| 8,290,628 B2* | 10/2012 | Yeo | | 700/277 |
| 8,321,188 B2* | 11/2012 | Johnson et al. | | 703/6 |
| 8,350,697 B2* | 1/2013 | Trundle et al. | | 340/539.3 |
| 8,816,870 B2* | 8/2014 | Plaisted et al. | | 340/657 |
| 8,996,188 B2* | 3/2015 | Frader-Thompson et al. | | 700/291 |
| 2004/0078154 A1* | 4/2004 | Hunter | | 702/61 |
| 2004/0260490 A1* | 12/2004 | Matsubayashi et al. | | 702/60 |
| 2009/0187499 A1* | 7/2009 | Mulder | G05B 15/02 | 705/30 |
| 2009/0195349 A1* | 8/2009 | Frader-Thompson | G01D 4/002 | 340/3.1 |
| 2009/0302994 A1* | 12/2009 | Rhee et al. | | 340/3.1 |
| 2009/0302996 A1* | 12/2009 | Rhee et al. | | 340/3.32 |
| 2010/0082499 A1* | 4/2010 | Luff | | 705/317 |
| 2010/0211509 A1* | 8/2010 | Jacobs | | 705/302 |
| 2010/0217550 A1* | 8/2010 | Crabtree et al. | | 702/62 |
| 2010/0289643 A1* | 11/2010 | Trundle et al. | | 340/545.1 |
| 2011/0112780 A1* | 5/2011 | Moss | | 702/62 |
| 2011/0119042 A1* | 5/2011 | Johnson et al. | | 703/6 |
| 2011/0270452 A1* | 11/2011 | Lu | G05B 19/042 | 700/291 |
| 2012/0065791 A1* | 3/2012 | Besore et al. | | 700/291 |
| 2012/0179477 A1* | 7/2012 | Luff | | 705/1.1 |
| 2012/0215464 A1* | 8/2012 | Daubney | | 702/24 |

\* cited by examiner

*Primary Examiner* — Charles Kasenge
(74) *Attorney, Agent, or Firm* — Ked & Associates LLP

(57) ABSTRACT

A system and a method for controlling an air conditioner are provided. In a system where respective points in which facility devices including an air conditioner are installed are connected to each other, power used information is collected by points and corresponding fee information is computed so that respective points can be managed, statistic data with respect to power amount information and fee information are transmitted to respective point so that a user read the information, thereby managing the information in the center or by points easily, and improving convenience.

18 Claims, 7 Drawing Sheets

FIG. 6

| 131 | Second yonsei university store    ID : admin |
| 132 | Summary information | Facility management | Energy management | A/S management | Report | Setting |
| 133 | Set show case operationr reference | Set electric used fee |

134:
- Application — For general (A)
- Agreement power/ fee application power — 28 kW
- Invalid Power measuring Device — ○유 ●무
- Power factor — 0 %
- Receiving Voltage — Low voltage power ▼

[Application]

1

SYSTEM AND METHOD FOR CONTROLLING AIR CONDITIONER

CROSS-REFERENCE TO RELATED APPLICATION

This application claims the priority benefit of Korean Patent Application No. 10-2012-0041076, filed on Apr. 19, 2012 in the Korean Intellectual Property Office, the disclosure of which is incorporated herein by reference.

BACKGROUND OF THE INVENTION

1. Field of the Invention

The present invention relates to a system and a method for controlling an air conditioner, and more particularly, to a system for controlling an air conditioner which monitors a power consumption amount of an air conditioner or a facility device including the air conditioner to control the air conditioner or a facility device, and a method thereof.

2. Description of the Related Art

An air conditioner is a facility device installed in order to provide more comfortable indoor environment by cleaning indoor air. The air conditioner discharges cool air into an interior of a room to control an indoor temperature. The air conditioner includes an indoor unit composed of a heat exchanger and installed indoors, and an outdoor unit composed of a compressor and a heat exchanger and supplying a refrigerant to the indoor unit.

In recent years, a system where facility devices such as an air conditioner, a ventilation device, a cooling device, and an illumination device to each other by a network are connected and integrally managed has been extended.

Particularly, a network has a tendency to install a facility device including an air conditioner by points in a national chain system and to construct a network such that the facility device is managed.

In recent year, as there is growing interest in a power consumption amount, there is a need to efficiently control power consumption in the summer or winter consuming great power. Accordingly, a demand controller is connected to the air conditioner, so that an operation rate or operation setting of the air conditioner is variably controlled according to power consumption to control the power consumption.

However, there is a great difficulty to systematically manage a plurality of facility devices in a wide area.

Accordingly, there is a demand to systematically and efficiently manage power consumption and an operation state with respect to total networks.

SUMMARY OF THE INVENTION

The present invention has been made in an effort to solve the above problems, and the present invention provides a system for controlling an air conditioner which easily manages a plurality of points forming a network by computing fee information by points and statistic data thereof based on power consumption information collected by points in a control system in which a facility device including an air conditioner is installed.

According to an aspect of the present invention, there is provided a control system for connecting a plurality of points in which one of an air conditioner, an illumination device, and an electric device is installed by a network, the system including: a plurality power measuring devices measuring independent power consumption amounts with the air conditioner, the illumination device, and the electric device installed in one point, respectively; a point controller connected to the power measuring devices for collecting and managing power amount information with respect to the point; and a central server connected to the point controller for storing power amount information by points received from the point controller, computing power fees with respect to respective points to compute statistic data with the power amount information by points and corresponding power fees, and transmitting the statistic data to the point controller.

According to an aspect of the present invention, there is provided a method of controlling an air conditioner, including:

measuring respective individual power consumption amounts with respect to an air condition, an illumination device, and an electronic device installed in one point; receiving power amount individually measured through a plurality of power measuring devices from a point controller by a central server as power amount information by points; and computing power fee information by points to compute statistic data with respect to power use and fees corresponding to the power amount information and the fee calculation information; and transmitting the statistic data to the point controller.

BRIEF DESCRIPTION OF THE DRAWINGS

The present invention will become more fully understood from the detailed description given herein below and the accompanying drawings, which are given by illustration only, and thus are not limitative of the present invention, and wherein:

FIG. 6 is an exemplary diagram illustrating an example of a data input screen of a point controller through connecting the central server.

DESCRIPTION OF THE PREFERRED EMBODIMENT

Hereinafter, exemplary embodiments according to the present invention will be described in detail with reference to the accompanying drawings. The present inventive concept may, however, be embodied in many different forms and should not be construed as limited to the example embodiments set forth herein. Rather, these example embodiments are provided so that this description will be thorough and complete, and will fully convey the scope of the present inventive concept to those skilled in the art. The same reference numbers are used throughout the drawings to refer to the same or like parts. Detailed descriptions of well-known functions and structures incorporated herein may be omitted to avoid obscuring the subject matter of the present invention.

Hereinafter, exemplary embodiments according to the present invention will be described in detail with reference to the accompanying drawings.

Figure 1:
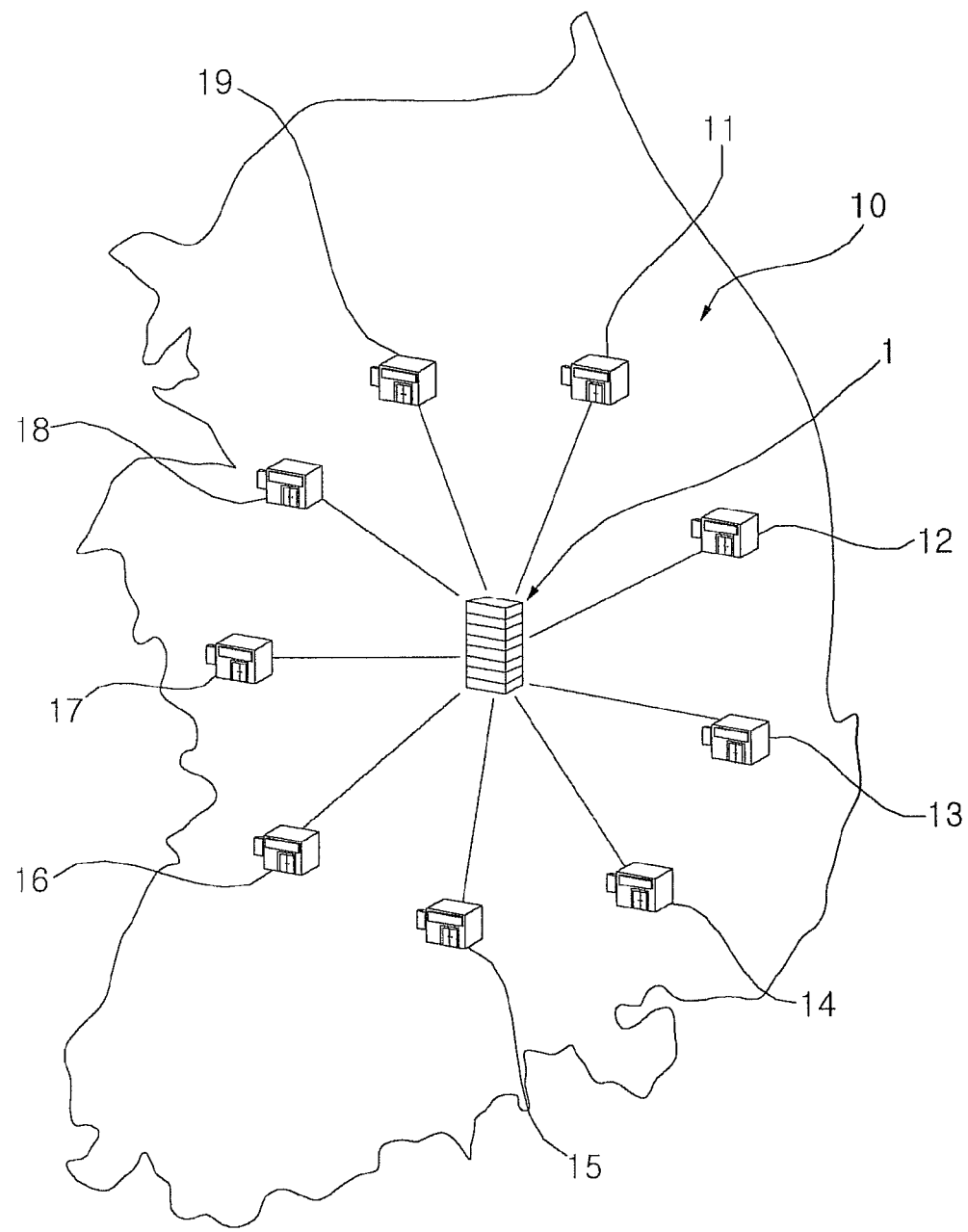
FIG. 1 is a diagram illustrating a configuration of a system where a plurality of points in which a facility device including an air conditioner is installed, respectively, are connected to each other according to an exemplary embodiment of the present invention.

FIG. 1 is a diagram illustrating a configuration of a system where a plurality of points in which a facility device including an air conditioner is installed, respectively, are connected to each other according to an exemplary embodiment of the present invention.

As shown in FIG. 1, in the system for controlling an air conditioner, a plurality of points 10 (11 to 19) in which a facility device including the air conditioner is installed are distributed over wide area, and are connected to a central server 1 of the center to form one network.

In this case, the system may further include a local server (not shown) connected to at least one of a plurality of points for managing the point and connected to the central server 1. The local server may act as a separate server repeating the point and the central server or one of the points may act as the local server.

In this case, respective points are distributed in the whole country and are connected to the central server 1, and the central server 1 monitors the points to manage operations of the points.

For example, each point may be a chain store such as a convenience store or a confectionery.

In the system for controlling an air conditioner, a plurality of points in which other facility devices are installed form a network so that the central server may manage and control a plurality of points which are distributed over a wide area. In this case, the control system may manage power consumption with each point for each local or country, and may be applied to a wide area to manage a plurality of contrives.

Figure 2:
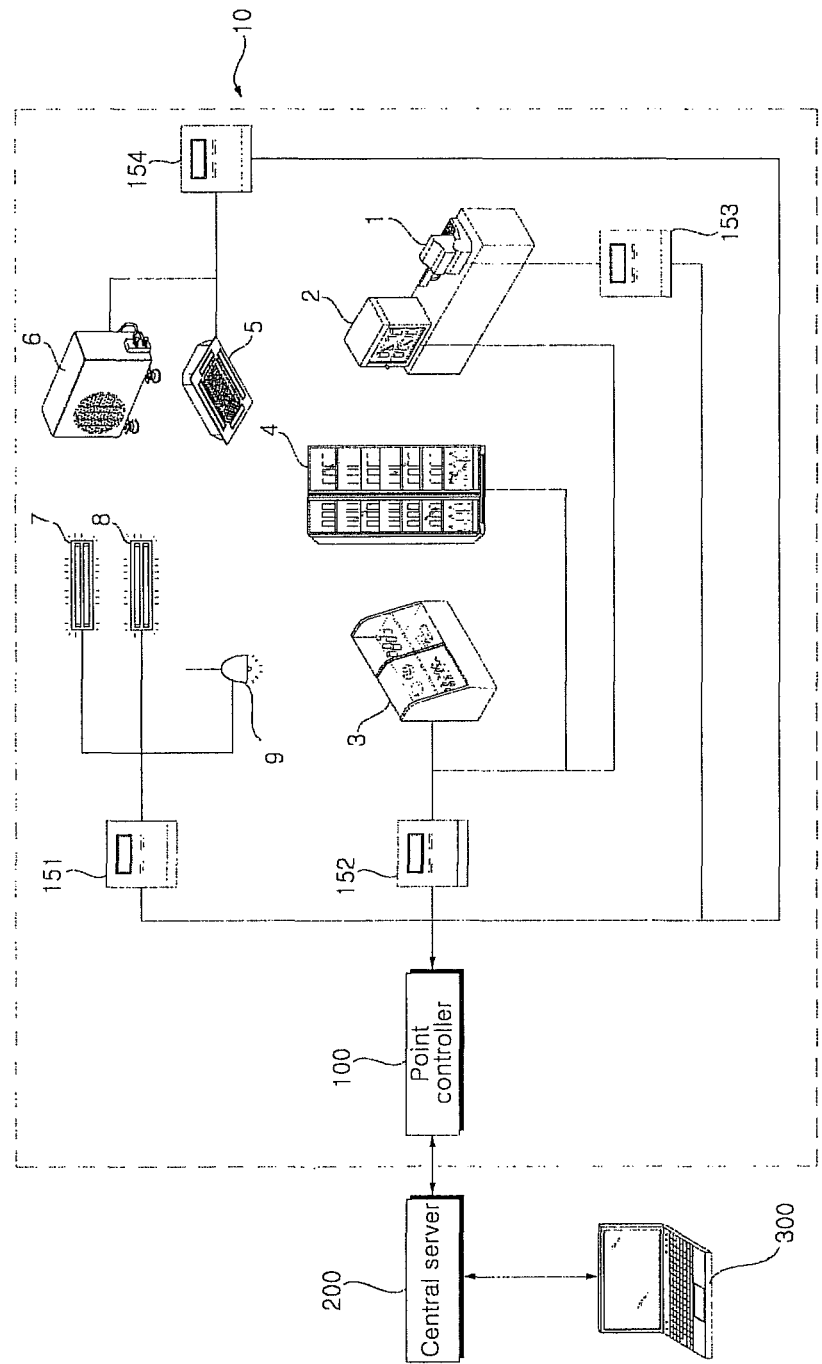
FIG. 2 is a diagram illustrating a connection structure of facility devices installed in a point according to an exemplary embodiment of the present invention.

FIG. 2 is a diagram illustrating a connection structure of facility devices installed in a point according to an exemplary embodiment of the present invention.

Referring to FIG. 2, a central server 1 or 200 is connected to a point controller 100. The central server 1 or 200 includes a terminal connecting with the central server 200 from the outside.

A cooling/heating device such as an air conditioner, a cooler, or a heating cabinet controlling internal air and a security device are installed inside the one point 10. A plurality of power measuring devices 151 to 154 connected to facility devices, respectively, for measuring power consumption are provided.

Indoor units 5, 7, and 8, an outdoor unit 6, a refrigerator 4, a show case 3, a heating cabinet 2, a calculator 1, and an illumination device 9 may be provided in the point.

The indoor unit 5, 7, and 8 conditions indoor air, and may be simultaneously or independently operated according to an indoor air conditioning load.

The air conditioner may include a unit such as a ventilation device, an air cleaner, a humidifier, and a dehumidifier as well as the indoor unit and the outdoor unit. A following description will be made on the assumption that the indoor unit and the outdoor unit are installed by way of example. The number of indoor units and outdoor units is not limited.

The indoor unit includes an indoor heat exchanger (not shown), an indoor fan (not shown), and an expansion valve (not shown) in which a supplied refrigerant is expanded, and a plurality of sensors (not shown). The outdoor unit includes a compressor (not shown) receiving a refrigerant and compressing, an outdoor heat exchanger (not shown) heat-exchanging the refrigerant with outdoor air, an accumulator (not shown) extracting gas refrigerant from the supplied refrigerant and providing the extracted gas refrigerant to the compressor, and a 4-way valve (not shown) selecting a flow passage of the refrigerant according to a heating operation.

At least one illumination device 9 is provided, and is connected by a connected switch.

The refrigerator 4 of the show case 3 is used to maintain the inside at a preset temperature and to have foods in one's custody. The show case 3 exposes cool air according to a cooling cycle to reduce an internal temperature. The heating cabinet 2 maintains the internal temperature greater than a predetermine temperature so that an internal object maintains warm.

The calculator manages money and issues a receipt.

As described above, a facility device installed in the point manages operation state data by devices and power consumption information by devices through a point controller 100 in the point.

The point controller 100 stores power consumption data measured and received from power measuring devices 151 to 154, and control data for each device and operation state data.

The point controller 100 is connected to the central server 200, transceives data, changes control setting with respect to each device according to data received from the central server 200, and monitors an operation of the central server 200. In this case, a unique account is allocated to the point controller 100 by points so that an identification (ID) according to the account is issued.

The point controller 100 may access the central server 200 through an ID serving as an account of a point to receive control data with respect to a corresponding point and a control recording.

The point controller 100 transmits collected and stored power consumption information by points to the central server 200 and receives corresponding fee information.

The central server 1 or 200 may identify respective points using accounts allocated to the points and transmit requested data. Each point controller may connect with the central server using the allocated account, and request point data to the central server.

In this case, IDs whose authority is different are allocated to the central server and each point. During access using an ID, data are restrictively displayed according to authority set to an ID.

During connecting with the central server 200 through a point ID, the point controller 100 receives only data with respect to a corresponding point from the central server 200.

The central server 200 may integrally or independently control a plurality of points according to setting, and may exceptionally process a predetermined point during integral control.

The central server 200 may provide data regarding a predetermined point according to a connection account with respect to connection of a terminal 300 such as a portable terminal or a notebook computer. In this case, the central server 200 transmits data of a point corresponding to a connection account regardless of a type of a connected terminal.

Figure 3:
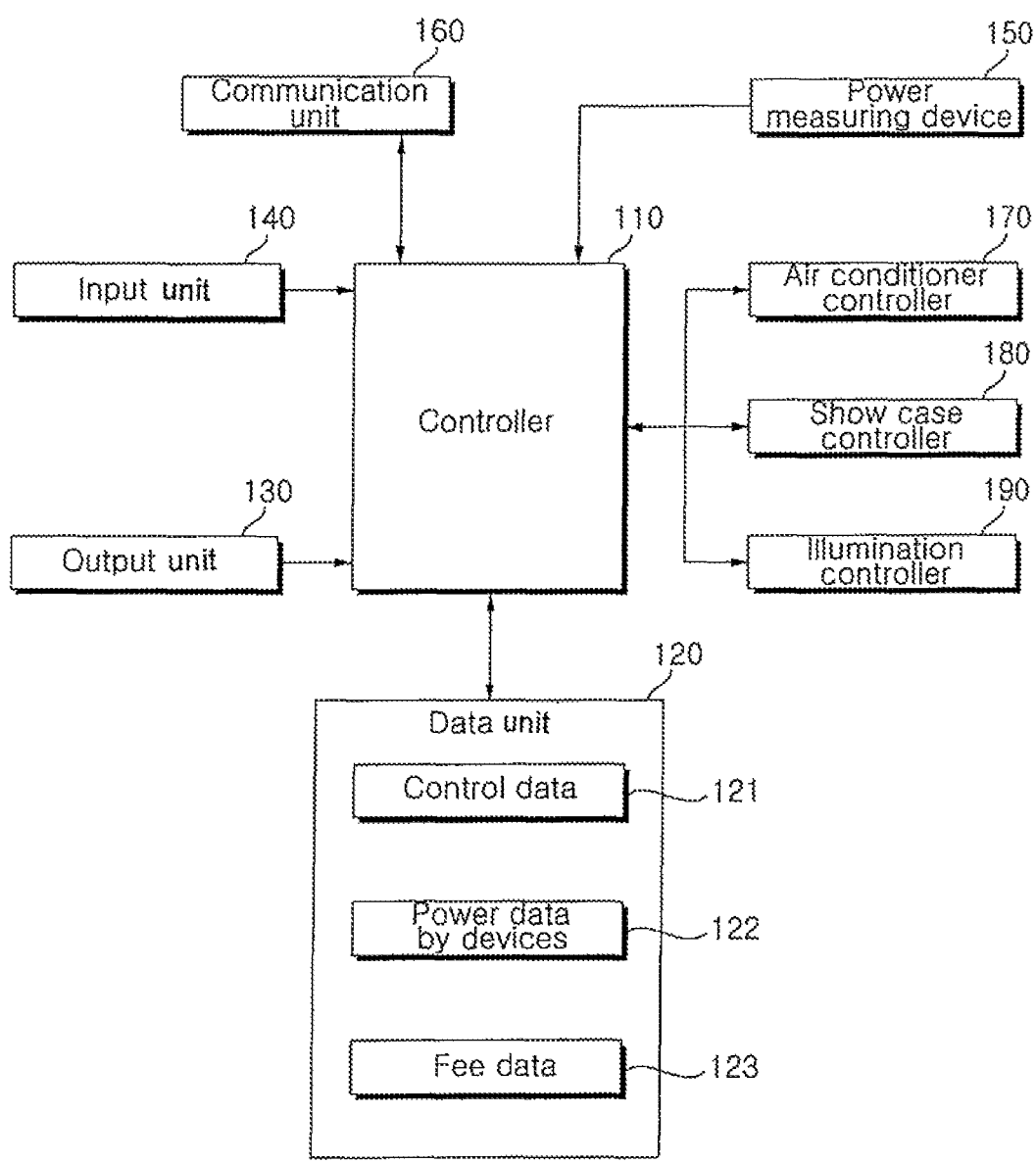
FIG. 3 is a block diagram illustrating a configuration of a point controller according to an exemplary embodiment of the present invention.

FIG. 3 is a block diagram illustrating a configuration of a point controller according to an exemplary embodiment of the present invention.

Referring to FIG. 3, a point controller 100 provided in each point includes an illumination controller 190, an air conditioner controller 170, a show case controller 180, a data unit 120, a communication unit 160, an input unit 140, an output unit 130, and a controller 110 controlling an overall operation of the point controller 100. A power measuring device 150 is connected to the controller 110.

The input unit 140 includes at least one button and switch, receives a control command with respect to each facility device, and provides the received control command to the controller 110.

The output unit 130 outputs data with respect to an operation state each facility device, outputs a control interface with respect to each facility device in a point, and outputs a specific effect sound or alarm sound in some cases.

The output unit 130 outputs point data received from the central server 200 on a screen.

Control data 121 for controlling operations of an air conditioner, an illumination device, and a show case, and power data 122 by devices with respect to a power consumption amount measured from the power measuring devices 151 to 154 are stored in the data unit 120. Information for calculating fees and fee data 123 received from the central server 200 is stored.

The controller 110 generates a control command with respect to an air conditioner, an illumination device, and a show case in response to a command inputted through the input unit 140 or a command received from the central server 200 through the communication unit 160, and provides the generated control command to an air conditioner controller, an illumination controller, and a show case controller.

The controller 110 receives a power consumption amount from the power measuring device 150 (151 to 154) to analyze the power consumption amount of each device, and collects information with respect to an operation state of each device. In this case, the controller 110 is connected to a gateway for receiving data with the power measuring device 150 (151 to 154) or the gateway is mounted in the controller 110 and collects information with respect to a power consumption amount.

The controller 110 transmits operation information of a device and power consumption information to the central server 200 through the communication unit 160. The controller 110 may receive an internal temperature, an external temperature, and a humidity of the point measured by a plurality of sensors (not shown).

The controller 110 may control devices according to power consumption by devices. When a device control command according to power consumption is received from the central server 200, the controller 110 controls an operation of each device according thereto.

The air conditioner controller 170 controls an operations of an outdoor unit 6, indoor units 5, 7, and 8, and a ventilation device according to a control command of the controller 110.

The air conditioner controller 170 controls a compressor to operate according to setting of an indoor unit and controls an operation frequency of the compressor to control an operation of an outdoor unit, so that cool air is discharged into an interior of a room. The air conditioner controller 170 controls an operation of a ventilation device according to a pollution level of indoor air, and controls the ventilation device to operate in conjunction with an operation of an indoor unit.

The illumination controller 190 controls brightness of each illumination device according to switch input and a control command of the controller 110.

The show case controller 180 controls temperatures of the show case 3, the refrigerator 4, and the heating cabinet 2 according to setting, and controls corresponding cooling or heating cycles.

Meanwhile, the central server 200 controls provision of data when a point controller 100, a central server or a portable terminal and an external terminal of each point connect and processes input data. The central server 200 performs authentication with respect to an accessed ID, and controls such that data corresponding to authority allocated to an ID is transmitted according to an authentication result.

Particularly, the central server 200 computes fee information with respect to each point based on power amount information by points received from the point controller 100 and fee calculation information according to an input of the point controller 100. When the fee calculation information by points is different from each other, different fees may be computed even in the points having the same power consumption.

In this case, the central server 200 computes a pattern, a cumulative amount, and a statistic value with power consumption of each point and statistic data with respect to a fee and transmit them to the point controller 100.

The central server 200 transmits power information and fee information of at least one of day, week, month, year, and a designated period in response to a request from the point controller or a terminal. The central server 200 computes and transmits information regarding a power consumption amount, an expected used amount, a cumulative used amount, and a target used amount with respect to one point. In this case, the central server 200 may compute power information and fee information in consideration of importance of a facility device with respect to power consumption of a point.

In this case, a point controller accumulates respective individual power information with respect to a facility device such as an air conditioner, an illumination device, and an electric device according to power amount information received from a plurality of power measuring devices, and periodically transmits the accumulated individual power information.

Figure 4:
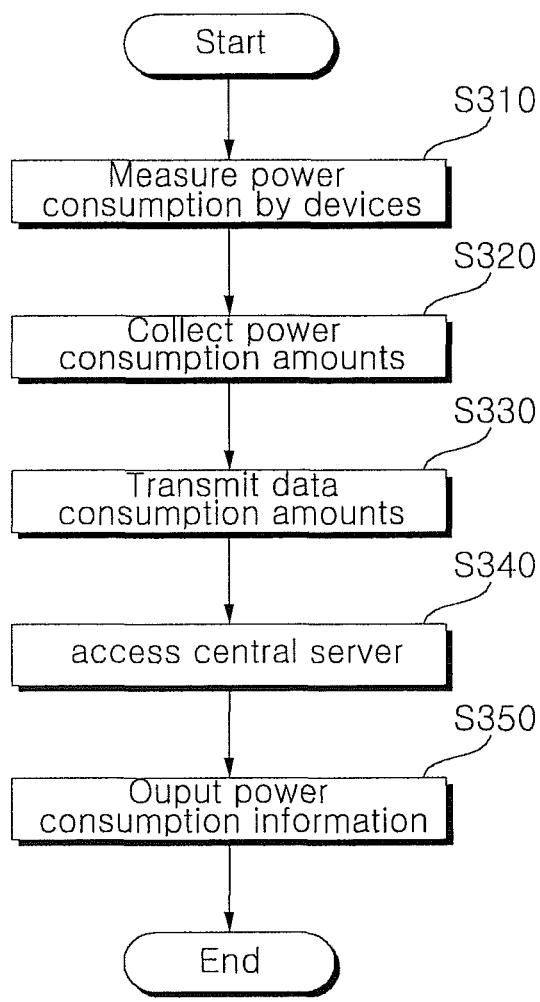
FIG. 4 is a flowchart illustrating a control method of a point controller according to an exemplary embodiment of the present invention.

FIG. 4 is a flowchart illustrating a control method of a point controller according to an exemplary embodiment of the present invention.

Referring to FIG. 4, power consumption amounts with respect to respective facility devices are measured by a plurality of power measuring devices 150 (151 to 154), a controller 110 of a point controller 100 receives the power consumption amounts from the measuring devices 151 to 154 (S310).

The controller 110 collects data regarding the power consumption amounts inputted from the power measuring devices as data of respective facility devices, and stores the data in a data unit 120 (S320).

The controller 110 of a point controller 100 transmits data stored in the data unit 120 to a central server 200 (S330).

The controller 110 of a point controller 100 connects with the central server 200 through a communication unit 160 (S340).

The controller 110 receives input account information, and receives data with respect to a point from the central server, particularly, power consumption information and fee data, and displays the data and the information (S350).

Figure 5:
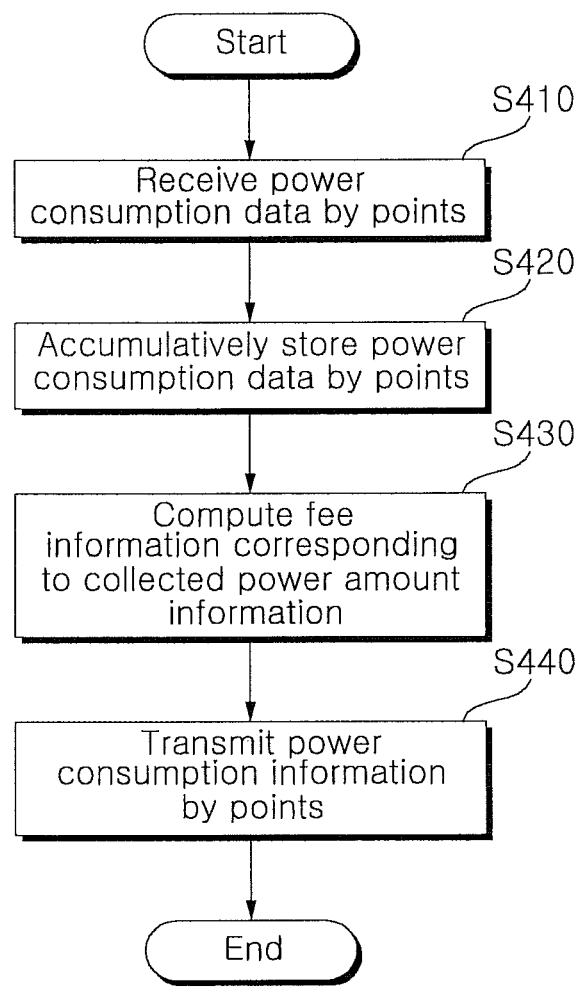
FIG. 5 is a flowchart illustrating an information collecting and operation method of a central server according to an exemplary embodiment of the present invention.

FIG. 5 is a flowchart illustrating information collecting and operation method of a central server according to an exemplary embodiment of the present invention.

Referring to FIG. 5, a central server 200 receives power consumption data by points (S410), classifies and accumulatively stores the power consumption data by points (S420). In this case, received data are information regarding a power consumption amount in each point.

The central server 200 computes fee information corresponding to collected power amount information (S430).

In this case, the central server 200 computes different fees by points with respect to a power amount corresponding to fee calculation information received by points. That is, when fee calculation information of a point is different even if a power amount is equally consumed, the fee is changed.

The central server 200 computes statistic data regarding power amount information and fee information with respect to data stored by points, namely, with respect to day, week, month, year, or a designated period.

When a point controller or a terminal connects, the central server 200 transmits data of a point corresponding to a connection account to a corresponding point controller or terminal according to a request from the point controller or the terminal (S440).

In some cases, the central server 200 may periodically transmit point data to the point controller.

FIG. 6 is an exemplary diagram illustrating an example of a data input screen of a point controller through connecting the central server.

Referring to FIG. 6, a point controller may access a center server to receive power information with respect to a point or fee calculation information.

When the point controller 100 accesses the central server 200 with a point account (131) through the point controller 100 or a terminal 300, the central server 200 transmits data of a corresponding point to a controller according to an authority set to the point account (131).

In this case, the controller of a point controller transmits power amount information with respect to respective facility devices inputted from a plurality of power amount measuring devices to the central server 200.

The central server 200 may confirm capacity information with respect to a point, information about a currently installed facility, energy management information, facility meter information, A/S management information, and information with respect to a report and setting (132).

In this case, a show case operation and a power used fee may be set through a setting menu (134).

A point controller inputs fee calculation information of a current point through connecting the central server.

In this case, the fee calculation information may include application of power use, contract power or fee application power, presence of invalid power meter, power factor, and receiving voltage information.

The fee calculation information is used to compute fee information of the central server.

Figure 7:
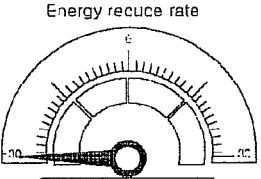
FIG. 7 is an exemplary diagram illustrating an example of a data screen by points provided through connecting the central server.

FIG. 7 is an exemplary diagram illustrating an example of a data screen by points provided through connecting the central server.

Referring to FIG. 7, when a point 10 connects with a central server 200 with a point account through a point controller 100 or a terminal 300, the central server 200 transmits data of a corresponding point to a controller according to authority set to a point account.

Accordingly, information about a corresponding point is displayed on the point controller 100 or the terminal 300 together with an account ID (131).

The central server 200 may confirm capacity information with respect to a point, information about a currently installed facility, energy management information, facility meter information, A/S management information, and information with respect to a report and setting (132).

Particularly, detailed information of an expected month used amount, an accumulated month used amount, a month target used amount is displayed on a screen of an output unit 130 (137). A user may confirm an energy reduce rate compared with a month target as an image, and information is displayed so that a consumption pattern for one month may be confirmed. In a plurality of facility devices in a point, power consumption information with respect to respective facility device may be confirmed.

Each point controller may manage energy consumption while changing or maintaining operation setting with respect to facility devices in the point through this. Setting of the information is changed so that information accumulated in units of days, weeks, months, and years may be confirmed.

Accordingly, in the present invention, in a structure in which a plurality of points are connected through a network and are managed through a central server, the point controller collects and continuously transmits information about power amounts to the central server, the central server having received data with respect to a plurality of points provides power amount information with respect to each point and fee information according thereto, particularly, statistic data about power consumption and fees.

Accordingly, since each point can analyze power consumption pattern and fees of the point and easily set and control a facility device, individual power control according to the point is possible, thereby controlling power consumption conveniently and efficiently.

The present invention relates a system and a method for controlling an air conditioner. In a system where respective points in which facility devices including an air conditioner are installed are connected to each other, power used information is collected by points and corresponding fee information is computed so that respective points can be managed, statistic data with respect to power amount information and fee information are transmitted to respective point so that a user read the information, thereby managing the information in the center or by points easily, and improving convenience.

A system and a method for controlling an air condition according to the embodiment of the invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A control system for connecting a plurality of points in which at least one of an air conditioner, an illumination device, or an electric device is installed by a network, the control system comprising:
   a plurality of power measuring devices that measures independent power consumption amounts with the at least one of the air conditioner, the illumination device, or the electric device installed at one point of the plurality of points, respectively;
   a point controller connected to the plurality of power measuring devices that collects and manages power amount information with respect to the point or the plurality of points; and
   a central server connected to the point controller, wherein the central server stores the power amount information by the plurality of points received from the point controller, computes power fees with respect to the respective plurality of points to compute statistic data with the power amount information by the plurality of points and corresponding power fees, and transmits the statistic data to the point controller, wherein the point controller stores the power consumption amounts measured and received from the plurality of power measuring devices, and control data and operation state data for each device, and manages energy consumption while changing or maintaining an operation setting with respect to the at least one of the air conditioner, the illumination device, or the electric device in the point, wherein the point controller accesses the central server through an ID serving as an account of the point to receive the control data with respect to a corresponding point and a control recording, wherein the ID whose authority is different is allocated to the central server and each of the plurality of points, and wherein during connecting with the central server through the ID, the point controller receives only data with respect to the corresponding point from the central server.

2. The control system of claim 1, wherein the central server transmits information regarding the power consumption amount, an expected used amount, a cumulative used amount, and a target used amount with respect to the one point in response to a request from the point controller or a terminal connected to the network.

3. The control system of claim 2, wherein the transmitted information by the central server with respect to the point is based on the account of the point.

4. The control system of claim 1, wherein the central server transmits electric fee information in response to a request from the point controller or a terminal connected to the network.

5. The control system of claim 1, wherein the central server transmits power information and fee information of at least one of a day, week, month, year, or a designated period according to a request from the point controller or a terminal connected to the network.

6. The control system of claim 1, wherein the point controller accumulates respective individual power information with respect to a facility device of the at least one of the air conditioner, the illumination device, or the electric device according to the power amount information received from the plurality of power measuring devices, and periodically transmits the accumulated individual power information.

7. The control system of claim 6, wherein the central server computes power information and fee information in consideration of an importance of a facility device with respect to power consumption of the point based on the respective individual power information with respect to the facility device of the at least one of the air conditioner, the illumination device, or the electric device according to the power amount information received from the point controller.

8. The control system of claim 1, wherein the point controller includes an output that outputs the control data and the operation state data for each device in the point.

9. The control system of claim 8, wherein the output outputs the statistic data received from the central server or a display.

10. The control system of claim 1, wherein the point controller includes an input through which a control command for each device in the point is input.

11. The control system of claim 1, wherein the point controller includes a communication device through which the point controller communicates with the central server.

12. The control system of claim 1, wherein the point controller includes an air conditioner controller that controls operation of the air conditioner based on a control command of the point controller, and wherein the air conditioner includes an outdoor device, at least one indoor device, and a ventilation device.

13. The control system of claim 1, wherein the point controller includes an illumination controller that controls a brightness of the illumination device based on a switch input and a control command of the point controller.

14. The control system of claim 1, wherein the electric device includes a show case, a refrigerator, and a heating cabinet, and wherein the point controller includes a show case controller that controls temperatures of the show case, the refrigerator, and the heating cabinet.

15. A method of controlling an air conditioner, the method comprising:
measuring respective individual power consumption amounts with respect to an air conditioner, an illumination device, and an electronic device installed at one point of a plurality of points by a plurality of power measuring devices;
receiving the power consumption amounts individually measured through the plurality of power measuring devices from a point controller by a central server as power amount information of the plurality of points; and
computing power tee information of the plurality of points to compute statistic data with respect to power use and fees corresponding to the power amount information and the fee calculation information; and
transmitting the statistic data to the point controller from the central server;
outputting the data received from the central server on a screen of the point controller; and
managing energy consumption while changing or maintaining an operation setting with respect to the air conditioner, the illumination device, and the electronic device in the point by the point controller, wherein the point controller accesses the central server through an ID serving as an account of the point to receive control data with respect to a corresponding point of the plurality of points and a control recording, wherein the ID whose authority is different is allocated to the central server and each or the plurality of points, and wherein during connecting with the central server through the ID, the point controller receives only data with respect to the corresponding point from the central server.

16. The method of claim 15, further including receiving the fee calculation information of each point of the plurality of points from the point controller by the central server, wherein the central server computes fee information according to different fee references by points according to the fee calculation information.

17. The method of claim 15, further including:
connecting the central server through a network in which the respective points of the plurality of points are connected to each other by a terminal; and
transmitting data with respect to a predetermined point to the terminal corresponding to a connection account of the terminal.

18. The method of claim 15, wherein the point controller stores the control data received from the central server.

* * * * *